United States Patent [19]

Liggett

[11] Patent Number: 4,559,764
[45] Date of Patent: Dec. 24, 1985

[54] SEALING BLADES FOR A SHRINK WRAPPING PROCESS

[75] Inventor: John V. Liggett, Plymouth, Mich.

[73] Assignee: Rockwell International Corporation, Pittsburgh, Pa.

[21] Appl. No.: 572,275

[22] Filed: Jan. 20, 1984

[51] Int. Cl.$^4$ .................. B65B 51/14; B65B 51/30
[52] U.S. Cl. ................................ 53/557; 53/373; 53/548; 156/515; 156/583.1
[58] Field of Search .............. 53/548, 550, 553, 557, 53/373, 329; 156/515, 580, 581, 583.1

[56] References Cited

U.S. PATENT DOCUMENTS

| | | | |
|---|---|---|---|
| 3,025,649 | 3/1962 | Stuhlman | 53/548 X |
| 3,053,723 | 9/1962 | Plach et al. | 156/515 X |
| 3,513,629 | 5/1970 | Hoagland et al. | 53/550 |
| 3,558,406 | 1/1971 | Kugler | 156/515 |

*Primary Examiner*—Horace M. Culver

[57] ABSTRACT

Improved set of sealing blades are for a shrink warpping process of the type wherein a plurality of the objects are advanced in spaced relationship along with and between two long sheets of heat-shrinkable polyethylene. A first set of sealing blades and a second set of the sealing blades respectively join the two sheets at a trailing side of one of the objects and at a leading side of an adjacent object. The two sheets are cut by a cutting blade between the first set of sealing blades and the second set of sealing blades to temporarily retain each of the objects between the two sheets prior to the polyethylene being heated to cause shrinkage thereof for sealing the object within the polyethylene. The improvement includes the first set of sealing blades having mating V-shaped sealing surfaces with bases thereof adjacent the cutting blade and legs thereof extending toward opposite sides of the one object. The second set of sealing blades has mating V-shaped sealing surfaces with bases thereof adjacent the cutting blade and legs thereof extending toward opposite sides of the adjacent object.

1 Claim, 3 Drawing Figures

SEALING BLADES FOR A SHRINK WRAPPING PROCESS

BACKGROUND OF THE INVENTION

1. Field of the Invention

This invention relates to improved sets of sealing blades for a shrink wrapping process and, more specifically, to such sealing blades which are utilized to join two sheets of heat-shrinkable polyethylene prior to it being heated to cause shrinkage thereof for sealing an object therein.

2. Description of the Prior Art

It is well known that objects can be sealed in heat-shrinkable polyethylene by a process in which the object is initially placed between two sheets of polythylene prior to its being eventually heated for shrinkage. In this process, the object is advanced along with and between two long sheets of heat-shrinkable polythylene which are normally supplied in large rolls. Each object is advanced beneath a sealing and cutting device which is used to partially encase the object by temporarily sealing the leading and trailing edges of the sheets at either end of the object prior to being advanced for eventual shrinkage. Heretofore, one set of sealing blades was utilized to seal at the trailing said of one object as another set of sealing blades sealed the sheets at the leading side of the adjacent object with the two sheets being cut between the adjacent seals. However, the prior art sealing blades were straight and extended transversely of the long sheets of polyethylene. As a result, the sides of the temporary package containing the object were left open and it was not uncommon for the object located between the leading seal and the trailing seal to be capable of movement transversely between the two sheets. When the object was transferred for heating and shrinking of the polyethelene in this temporarily wrapped manner, if the object were off center, there was no guarantee that the polyethylene would properly shrink around the object to produce a complete, effective seal.

SUMMARY OF THE INVENTION

It is therefor an object of this invention to provide improved sets of sealing blades for a shrink wrapping process which will ensure that the object to be sealed withi the polyethelene will be properly maintained centrally between two sheets of heat-shrinkable polyethylene prior to its being heated for shrinkage.

Other objects of the invention are provided in a preferred embodiment thereof including improved sets of sealing blades for a shrink wrapping process of the type wherein a plurality of objects are advanced in spaced relationship along with and between two long sheets of heat-shrinkable polyethylene. A first set of sealing blades and a second set of sealing blades respectively join the two sheets at a trailing side of one of the objects and at a leading side of an adjacent object. The two sheets are cut by a cutting blade between the first set of sealing blades and the second set of sealing blades to temporarily retain each of the objects between the two sheets prior to the polyethlene being heated to cause shrinkage thereof for sealing the object within the polyethylene. The improvement includes the first set of sealing blades having mating V-shaped sealing surfaces with bases thereof adjacent the cutting blade and legs thereof extending toward opposite sides of the one object. The second set of sealing blades has mating V-shaped sealing surfaces with bases thereof adjacent the cutting blade and legs thereof extending toward opposite sides of the adjacent object.

DETAILED DESCRIPTION OF THE PREFERRED EMBODIMENT

Figure 1:
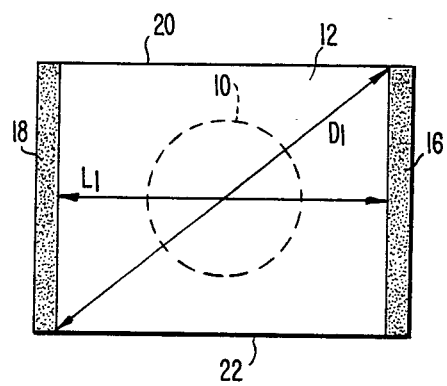
FIG. 1 is a top view of an object which has been temporarily wrapped between two sheets of heat-shrinkable polyethylene by the use of prior art sealing blades.

As seen in FIG. 1, an object 10 is temporarily retained between two sheets 12, 14 of heat-shrinkable polyethylene as an intermediate step in a shrink wrapping process which employs prior art sealing blades (not shown). Specifically, in both the prior art and the preferred embodiment, the object 10 is a stack of four wheel covers which are to be shrink wrapped for sealed protection prior to shipment. Since the view shown in FIG. 1 is a top view, only the top sheet 12 of polyethylene can be seen.

In the prior art configuration, at the intermediate stage of the heat shrinking process, the top sheet 12 and the bottom sheet 14 are joined by the application of heat by the prior art sealing blades at a leading edge 16 and a trailing edge 18. However, since the prior art blades are straight, the two side edges 20, 22 are not joined so that the entire sides of the temporary package remain opened until the final stages of the shrink wrapping process. As a result, it is possible for the object 10 to be dislocated from a central position which could interfere with a proper shrink wrapping and prevent the object 10 from being properly sealed. Additionally, because the diagonal length $D_1$ of the polyethylene of sheet 12 and sheet 14 is significantly different from the longitudinal length $L_1$ of sheet 12 and sheet 14, the amount of material to eventually be shrunk is considerably greater along the diagonal length $D_1$ than along the longitudinal length $L_1$. This condition also results in less than optimum package tightness and decreases the overall effectiveness of the sealed shrink wrapping process.

Figure 2:
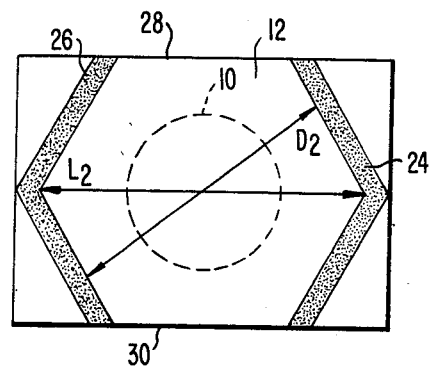
FIG. 2 is a top view of an object which has been temporarily wrapped between two sheets of heat-shrinkable polyethylene utilizing the improved sets of sealing blades.

On the other hand, as seen in FIG. 2, a similar object 10 will be temporarily retained between the sheets 12, 14 of polyethylene by utilizing the improved sets of sealing blades of the present invention to produce a leading seal 24 and a trailing seal 26. The seals 24, 26 are V-shaped to partially encircle the object 10 and restrict its movement from a central location. Additionally, although the side edges 28, 30 of the sheets 12, 14 are not sealed, the opening therebetween is significantly smaller to eliminate the possiblity that the object 10 will be removed from between the sheets 12, 14 during the shrinking step of the process. Further, since the diagonal length $D_2$ and the longitudinal length $L_2$ are closer to the same value, the shrinkage would be more uniform across the object 10 for better, more reliable sealing.

Figure 3:
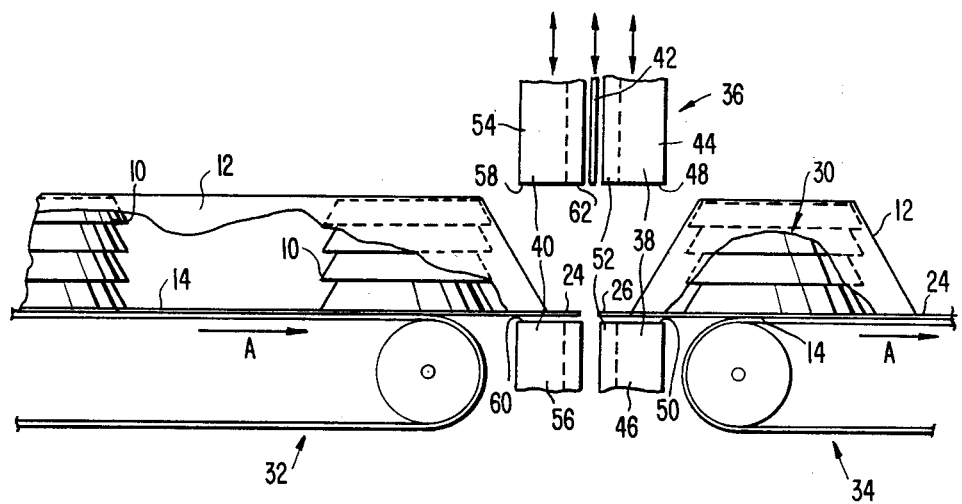
FIG. 3 is a fragmentary elevational view showing the process utilizing the improved sets of sealing blades.

As seen in FIG. 3, the preferred shrink wrapping process employs an intermediate step which utilizes the improved sets of sealing blades to temporarily encase the object 10 as shown in FIG. 2. Specifically, the top sheet 12 and the bottom sheet 14 are initially long and provided from supply rolls (not shown). The objects 10 are advances in spaced relationship along with and between the two long sheets 12, 14 of heat-shrinkable polyethylene by a conveyor 32. After the leading seal 24 and the trailing seal 26 are provided, each object 10, partially encased between the sheets 12, 14, is conveyed by conveyor 34 for further processing. It is the object of the conveyors 32, 34 to advance the objects 10 with proper alignment to and away from a sealing and cutting station 36. Although the conveyors 32, 34 move in a direction as indicated by the arrows A, the movement is not continuous. A sensing and timing mechanism (not shown) causes the conveyors 32, 34 to begin operation after each object 10 is partially encased at both ends by the sealing and cutting station 36 (as shown in FIG. 3) and to remove the encased object 10 from its position at the right for further processing. At the same time, a new object 10 is supplied to the position at the right at the station 36. When the new object 10 is so positioned, the conveyors 32, 34 are again stopped until the operation of the sealing and cutting station 36 is again completed.

The sealing and cutting station 36 includes two sets 38, 40 of sealing blades and a movable cutting blade 42. The first set 38 of sealing blades includes an upper, movable blade 44 and a lower, stationary blade 46 respectively having mating V-shaped sealing surfaces 48, 50. The sealing surfaces 48, 50 each include a base 52 which is adjacent the cutting blade 42 and legs thereof extending toward opposite sides of the object 10 at its trailing side. The second set 40 of sealing blades each include an upper, movable blade 54 and a lower, stationary blade 56 respectively having mating V-shaped sealing surface 58, 60. The sealing surfaces 58, 60 have bases 62 thereof which are adjacent the cutting blade 42 and legs extending therefrom toward opposite sides of the next object 10 at a leading side thereof. As a result, the sets 38, 40 of sealing blades at the sealing and cutting station 36 are intended to simultaneously seal the trailing side of one of the objects 10 and the leading side of the next, adjacent object 10. The cutting blade 42 is employed to cut the sheets 12, 14 between the seals to release the partially encased object 10 at the right of the station 36. As seen in FIG. 3, sealing at 24, 26 has been accomplished and the upper sealing blades 44, 54 and the cutting blade 42 have been retracted for repositioning by the conveyors 32, 34. When this is accomplished, the conveyor 32, 34 advance the partially encased object 10 at the right of FIG. 3 and cause the next object 10 to be positioned to the right of the sealing and cutting station 36. When the next object 10 is so positioned, the sensing and timing mechanism will cause the conveyors 32, 34 to stop and the sealing blades 44, 54 and cutting blade 42 to be lowered for sealing and cutting as shown in FIG. 3.

In order to better understand this invention, it is proper to include some dimensions of the object and the polyethelene and a further explanation of other features which could be employed in the improved sets of sealing blades. The object 10, as mentioned hereinabove, is preferably in the form of a stack of wheel covers. The dimensions of the covers range from a diameter of about 13 inches to about 15 inches. The stacks may have a height ranging from 4 inches to 12 inches. The heat-shrinkable polyethylene has 1.75 mil thickness and is provided in rolls about 22 inches wide. The polyethylene has a high blow-up ratio and, although not shown in FIG. 3, the eventual heating step for the shrinkage will be accomplished at 400° F. to 420° F.

The preferred sealing blades are normally heated to 275° F. to 330° F. and are maintained in contact with the sheets of polythylene for about 1 to 1.25 seconds. Additionally, the sealing blades, as shown in FIG. 3, are represented in a simplified form. In some configurations, the mating surface therebetween are not flat and do not lie totally within a horizontal plane, as shown, but include a concave surface and a mating convex surface in order to grip the polythylene therebetween during the sealing period. Additionally, it is not uncommon for the mating surfaces to be provided some type of rubber or other material to provide a gripping surface and easy alignment between the mating blades. Any number of alterations may be made to the preferred embodiment without departing from the scope of the invention as claimed.

I claim:

1. Improved sets of sealing blades for a shrink wrapping process of the type wherein a plurality of objects are advanced in spaced relationship along with and between two long sheets of heat-shrinkable polyethylene, a first of said sets and a second of said sets of said sealing blades respectively join said two sheets at a trailing side of one of said objects and at a leading side of an adjacent said object, and said two sheets are cut by a cutting blade between said first set of sealing blades and said second set of sealing blades to temporarily retain each of said objects between said two sheets prior to said polyethylene being heated to cause shrinkage thereof for sealing said object with said polyethylene wherein said improvement comprises:

said first set of said sealing blades having mating V-shaped sealing surfaces with bases thereof adjacent said cutting blades and legs thereof extending toward opposite sides of said object;

said second set of said seaing blades having mating V-shaped sealing surfaces with bases thereof adjacent said cutting blade and legs thereof extending toward opposite sides of said adjacent object; and the first and second sets of sealing blades being disposed to form oppositely directed V-shaped seals on the leading and trailing sides of each object for encircling same.

* * * * *